June 15, 1943.     W. LEATHERS     2,321,922
AUTOMATIC METER READING APPARATUS
Original Filed Oct. 18, 1940
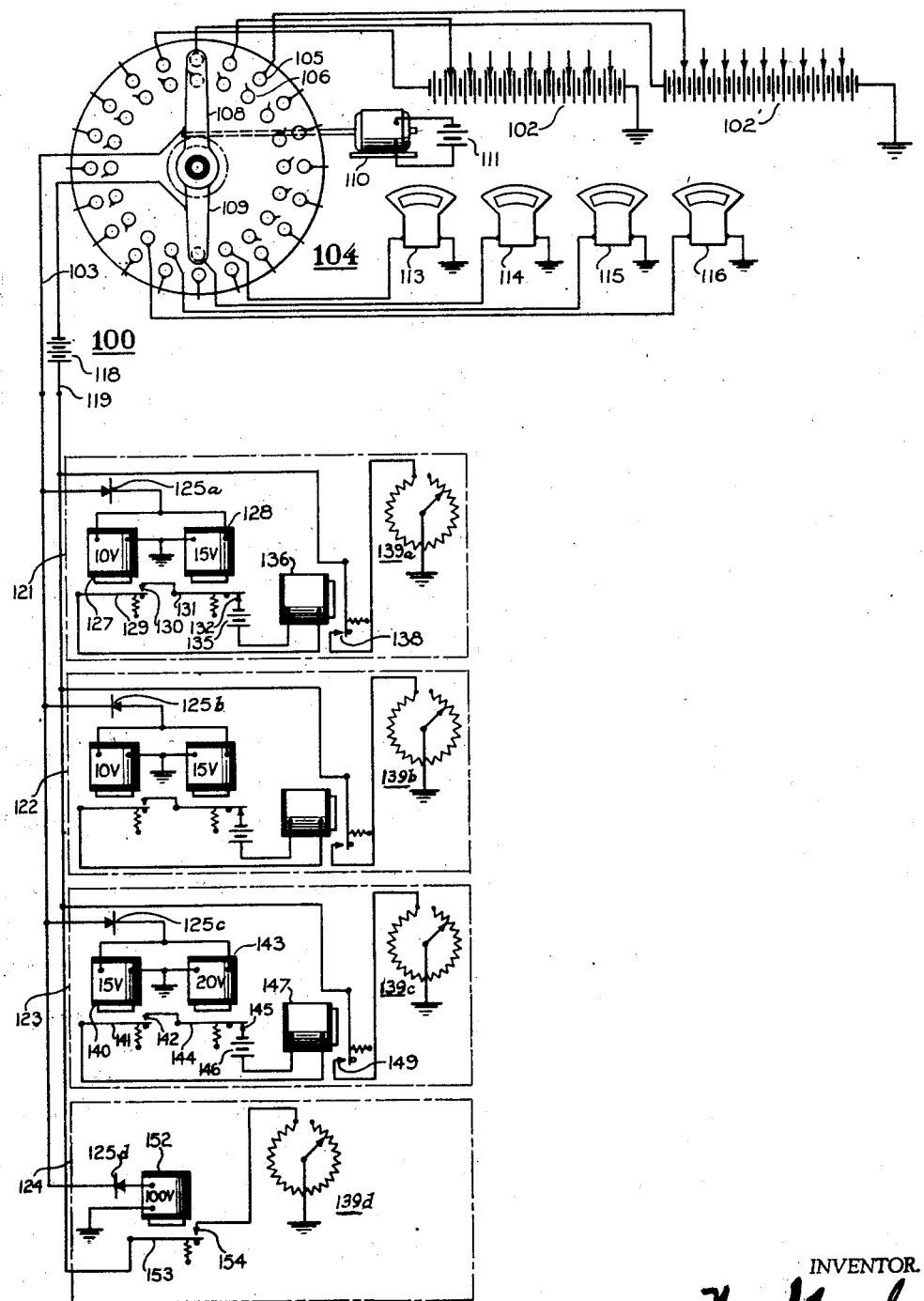
INVENTOR.
Ward Leathers Patented June 15, 1943

2,321,922

UNITED STATES PATENT OFFICE 2,321,922

AUTOMATIC METER READING APPARATUS

Ward Leathers, Brooklyn, N. Y., assignor to International Business Machines Corporation, New York, N. Y., a corporation of New York Original application October 18, 1940, Serial No. 361,801, now Patent No. 2,285,819, dated June 9, 1942. Divided and this application April 18, 1942, Serial No. 439,539

1 Claim. (Cl. 177—353)

The present invention relates to electric signaling and indicating systems of the type wherein the position of a movable member, such as, for example, a meter pointer or other indicator may accurately be determined at a remote point by a resistance measuring method.

More specifically the invention relates to a telemetric system which is fully automatic in its operation and wherein the relative positions, and consequently the relative indications, of a plurality of movable meter pointers or other indicating members, each associated with a respective meter unit, which units may be widely separated, may successively be determined and caused to be registered, recorded or otherwise indicated by a resistance measuring process at a central station without necessitating the use of individual lines for each indicating member. Such a system is fully illustrated and described in my prior Patent No. 2,285,819, dated June 9, 1942, for Automatic meter reading apparatus, of which this application is a division.

The objects of the present invention as disclosed herein are in general the same as the objects set forth in my prior patent wherein there was claimed a means for individually selecting a large number of meters for reading purposes and for subsequently causing the selected meters to be read by a resistance measuring process at a central station over a simplified wire system by the expedient of utilizing primary and secondary selectors capable of being selectively actuated by the application of current impulses of different characteristics.

A further object of the invention, in one form thereof, is to provide a fully automatic telemetering system of the character set forth above wherein a plurality of outlying stations, each having associated therewith a meter to be read, and connected together in a simple parallel circuit, may be selected in succession by application to the circuit at a central station of a series of current impulses of varying voltage and of opposite polarity, and an indication of the respective meters thereof rendered at the central station, the whole process being entirely automatic in its operation.

In carrying out the above mentioned objects, briefly, the invention contemplates the provision of a series of heavily damped current measuring devices which are located at the central station and which correspond in number to the number of meters at the respective outlying positions. The various meters are capable, potentially, of being electrically connected in parallel in a reading circuit leading to the central station. Each meter has associated therewith at its respective outlying position, a marginal relay device and a unidirectional device which are so arranged that current impulses of varying voltage or of opposite polarity will selectively actuate the relays preferably in a sequential manner to connect their respective meters in the reading circuit for reading purposes by a resistance measuring method. Successive selection of the various meters for reading purposes is accompanied by substantially instantaneous electrical connection thereof to their respective current measuring devices by means of a step-by-step multiplexing device or selector switch located at the central station and such connection renders the current measuring device instantly indicative of the resistance of the successively selected meters or determined by the respective indications thereof.

Other objects and advantages of the invention will become more readily apparent as the nature of the invention is better understood.

In the accompanying drawing forming part of this specification, the figure is a diagrammatic view of the telemetering system showing a central station and a plurality of outlying stations electrically connected in parallel and to the central station.

In the above described view, similar characters of reference have been employed to designate similar parts throughout.

Referring now to the figure, wherein one embodiment of the invention is shown, a central station generally characterized by the numeral 100 is connected to a plurality of outlying stations, each including a variable resistance generally characterized by the numeral 139, by means of a reading conductor 119 having a battery 118 interposed therein, and a selector conductor 103. A multiplexing device in the form of a selector switch 104 consists of an annular series of contacts 105, a rotary contact arm or brush 108 therefor, and a second annular series of contacts 106 spaced inwardly from the series 105, together with a second rotary contact arm or brush 109 for the latter series of contacts. The contact arms 108 and 109 are designed for rotation in phase relationship about a central axis and are driven in unison by a motor 110 adapted to be energized from a source of current, as, for example, a battery 111. The selector line 103 is connected to the brush 108 and thus is adapted to be connected to each of the contacts 105 successively when the motor 110 is in operation.

Each of the contacts 105 is connected to one of a series of taps on a battery 102 or to a similar series of taps on a battery 102', one end of each battery being grounded. The batteries 102 and 102' are reversed in polarity, the battery 102 making the line 103 negative and the battery 102' making the line 103 positive with respect to ground potential. Since each contact 105 taps a different voltage from the batteries 102 and 102', the line 103 will alternately assume varying potentials of opposite polarity as the brush 108 rotates about its central axis.

While only four outlying stations 121, 122, 123 and 124 have been shown in the accompanying drawing it will be understood, however, that a greater or lesser number of these stations may be employed, if desired.

The application of a ten volt impulse to the selector line 103 from the central station 100 in such a manner as to make the line 103 positive with respect to ground will serve to energize a relay 127 at the outlying station 121 which is responsive to a minimum voltage potential of ten volts and cause its armature 129 to close a pair of contacts 130. The ten volt impulse will also be applied to a relay 128 which is connected in parallel with the relay 127. The relay 128, however, is responsive to a minimum voltage potential of fifteen volts and therefore it will not become actuated when an impulse of only ten volts is applied to the selector line 103. Therefore, upon application to the line 103 of a selecting impulse of ten volts of a proper polarity, the contacts 130 will become closed, thus completing a local circuit containing a battery or other source of current 135 and a relay 136. Completion of the circuit through the relay 136 serves to close a pair of contacts 138 contained in a reading circuit including the line 119, battery 118 and variable resistance 139a. The contact arms 108 and 109 are arranged to maintain a constant phase relationship, and thus the meters 113, 114, etc., at the central station 104, each of which corresponds to a variable resistance 139 at the outlying station 121, will upon successive closing of the contacts 138 be successively connected in the reading circuit and the portion of each resistance 139 contained in the circuit will be indicated in terms of current flow through a corresponding meter 113 at the central station 100.

The outlying station 122 is also adapted to be actuated by application to the line 103 of an impulse of ten volts but of opposite polarity, i. e., an impulse which will render the line 103 negative with respect to ground. A copper-oxide rectifier 125a in series with the relays 127 and 128 in the outlying station 121 permits only current of a character that will make the line 103 positive with respect to ground to affect the relays 127 and 128. A copper-oxide rectifier 125b, similarly connected at the station 122, permits only current that will make the line 103 negative with respect to ground to affect the relays in this latter station. Upon closing of the local circuit in the station 122 the variable resistance 139b thereof is reflected by a reading of a corresponding meter 114 at the central station.

Application of an impulse of fifteen volt potential to the line 103 from the central station 100 in such a manner as to make the line 103 positive with respect to ground will serve to cause the station 123 to be selected for actuation. A relay 140 designed to actuate upon application thereto of a fifteen volt impulse will, upon energization, cause an armature 141 to close a pair of contacts 142. A relay 143 connected in parallel to the relay 140 will fail to become fully energized because it is designed to operate on an impulse of not less than twenty volts. A copper-oxide rectifier 125c prevents current of opposite polarity, regardless of its potential, from affecting the relays 140 and 143. Thus, when an impulse of fifteen volts potential, which will make the line 103 positive with respect to the ground, is applied to the line 103, a relay 147 is energized by means of the battery 146 contained in a local circuit, and a pair of normally open contacts 149 become closed to establish a reading circuit for the resistance 139c in the manner previously described in connection with the variable resistances 139a and 139b in the outlying stations 121 and 122 respectively, so that its indication may be reflected by its corresponding meter 115 in the central station 100.

The application to the line 103 of an impulse of fifteen volts in such a manner as to make the line 103 positive with respect to ground, in addition to actuating the outlying station 123 also serves to energize both of the relays 127 and 128 of the station 121. Since the relays of this latter station are receptive to current impulses of the same polarity, however, the relay 128 becomes fully energized in such an instance and causes the armature 131 to open the contacts 132 and thus open the local circuit of the relay 136 and prevent the variable resistance 139a from being connected in the reading circuit leading to the central station through the reading line 119.

Numerous additional stations may be included in the series 121, 122, etc., and it is thought that the manner of their inclusion therein will be apparent without further description. Application of impulses to the selector line 103 in steps of five volt potential differentials will serve for the selection of either one of two stations depending upon the polarity of the applied impulse.

Assuming that the potential of the highest selector impulse employed in the system is one hundred volts, there may be two stations which are capable of actuation by such an impulse, depending upon the polarity thereof. In the accompanying drawing only one such "end" station is shown in the interest of simplicity. These end stations differ from the preceding stations in that they require only one relay.

The station 124 represents an end station which becomes actuated when a pulse of one hundred volts of such polarity that the line 103 is rendered negative with respect to ground. In case of the application of such pulse, a relay 152 becomes fully energized and causes an armature 153 to close a pair of contacts 154 thus connecting a variable resistance 139d directly into the circuit for reading purposes by means of a corresponding meter at the central station 100. A copper-oxide rectifier 125d prevents an impulse of one hundred volts of opposite polarity from affecting the relay 152.

The contact arm or brush 108 alternately multiplexes or successively connects the selector line 103 to the various voltage taps on the batteries 102 and 102'. The contact arm or brush 109 successively connects the reading line 119 to the various measuring meters 113, 114, 115, 116, etc. The brushes 108 and 109 are maintained in constant phase relationship, or, in other words, are rotated in unison so that each outlying station 121, 122, etc., is selected successively for connection to a respective reading meter 113, 114, etc. The battery 118 and the line 119 supplies the reading current whereby each measuring meter will render an indication proportionate to a variable resistance 139 at its respective outlying station.

The invention is not to be limited to the exact arrangement of parts shown in the accompanying drawing or described in this specification as various changes in the details of construction may be resorted to without departing from the spirit of the invention. For example, while the receiving apparatus at the central station utilizes a power driven multiplexing switch for fully automatic selection of the various outlying stations, it is obvious that if desired a manually operated selector device may be employed for random selection of the stations. Only insofar as the invention has particularly been pointed out in the accompanying claim is the same to be limited.

What is claimed is:

In a telemetric system, apparatus for selectively closing at a central station a series of normally open local circuits each located at an outlying station, comprising a normally open switch and a normally closed switch arranged in series in each local circuit, a solenoid for each switch, said solenoids being operable upon energization thereof to open the normally closed switch and to close the normally open switch respectively, a selector circuit including a main channel connected to the central station and branch channels connected to the main channel in parallel relationship and each connected to and serving an outlying station, the solenoids of each outlying station being connected in parallel relationship in a respective branch channel, the solenoids of each outlying station being responsive to direct current impulses of different voltage characteristics for actuation thereof, the solenoids of certain successive alternate outlying stations being responsive to current impulses of different but progressively higher voltage characteristics for their actuation and the solenoids of other successive alternate outlying stations also being responsive to current impulses of different but progressively higher voltage characteristics for their actuation, the solenoids of said first alternate series of outlying stations being responsive to unidirectional current of one polarity and the solenoids of said second alternate series of outlying stations being responsive to unidirectional current of opposite polarity, and means at the central station for successively applying current impulses of progressively increasing voltage characteristics and of opposite polarity alternately to the main channel.

WARD LEATHERS.